United States Patent
Hatae et al.

(10) Patent No.: US 9,926,819 B2
(45) Date of Patent: Mar. 27, 2018

(54) LUBRICATING DEVICE OF INTERNAL COMBUSTION ENGINE

(71) Applicant: HONDA MOTOR CO., LTD., Tokyo (JP)

(72) Inventors: Ryo Hatae, Wako (JP); Kohei Omori, Asaka (JP); Kenichi Nakano, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 267 days.

(21) Appl. No.: 15/065,406

(22) Filed: Mar. 9, 2016

(65) Prior Publication Data

US 2016/0281554 A1 Sep. 29, 2016

(30) Foreign Application Priority Data

Mar. 27, 2015 (JP) ................. 2015-066613

(51) Int. Cl.
*F01M 1/04* (2006.01)
*F01M 9/10* (2006.01)
*F01M 1/02* (2006.01)
*F01M 11/02* (2006.01)
*F02B 61/02* (2006.01)
(Continued)

(52) U.S. Cl.
CPC ............. *F01M 1/02* (2013.01); *F01M 1/12* (2013.01); *F01M 11/02* (2013.01); *F02B 61/02* (2013.01); *F16H 57/0424* (2013.01); *F16H 57/0456* (2013.01); *F16H 57/0475* (2013.01); *F01M 1/04* (2013.01); *F01M 1/16* (2013.01); *F01M 2001/0238* (2013.01);
(Continued)

(58) Field of Classification Search
CPC . F01M 1/02; F01M 11/02; F01M 1/04; F01M 1/16; F01M 2001/0269; F01M 2001/0238; F01M 2001/0253; F01M 11/0004; F02B 61/02; F02B 2075/027; F16H 57/0424; F16H 57/0475; F16H 57/0456
USPC ........................................ 123/196 R, 196 CP
See application file for complete search history.

(56) References Cited

U.S. PATENT DOCUMENTS 5,588,405 A * 12/1996 Sawa ...................... F01L 1/053
  123/196 M
8,316,816 B2 * 11/2012 Sato ........................ F01M 11/02
  123/196 CP (Continued)

FOREIGN PATENT DOCUMENTS

JP  2009-243437  10/2009

*Primary Examiner* — David Hamaoui
*Assistant Examiner* — Syed O Hasan
(74) *Attorney, Agent, or Firm* — Rankin, Hill & Clark LLP (57) ABSTRACT

In a lubricating device of an internal combustion engine having a crank chamber and a transmission chamber, which is arranged in the rear of the crank chamber so as to accommodate therein a gear transmission provided with a main shaft and a pump shaft. The pump shaft is shared by a scavenging pump and a feed pump for feeding oil to a part to be lubricated and to which motive power from the crank shaft is transmittable. An axis of the pump shaft is arranged below an axis of the main shaft. A pump gear located on the pump shaft meshes directly with a primary driven gear, which meshes with a primary drive gear located on the crank shaft so as to form a primary gear reduction mechanism in cooperation with the primary drive gear.

11 Claims, 5 Drawing Sheets

(51) Int. Cl.
*F01M 1/12* (2006.01)
*F16H 57/04* (2010.01)
*F02B 75/02* (2006.01)
*F01M 1/16* (2006.01)

(52) U.S. Cl.
CPC .............. *F01M 2001/0253* (2013.01); *F01M 2001/0269* (2013.01); *F01M 2001/126* (2013.01); *F02B 2075/027* (2013.01)

(56) References Cited

U.S. PATENT DOCUMENTS

| 2004/0250789 | A1* | 12/2004 | Morii | F01M 1/12 |
| | | | | 123/192.2 |
| 2005/0061287 | A1* | 3/2005 | Takahashi | F01M 9/06 |
| | | | | 123/195 H |
| 2011/0061492 | A1* | 3/2011 | Terada | F16H 57/043 |
| | | | | 74/606 R |

\* cited by examiner

LUBRICATING DEVICE OF INTERNAL COMBUSTION ENGINE

BACKGROUND OF THE INVENTION

Field of the Invention

The present invention relates to a lubricating device of an internal combustion engine having a crankcase constituting a part of an engine main body mounted on a vehicle, a crank chamber and a transmission chamber provided in the crankcase, the transmission chamber arranged in the rear of the crank chamber and accommodating therein a gear transmission provided with a main shaft to which motive power from a crank shaft is able to be inputted, and a pump shaft that is shared by a scavenging pump for pumping oil out of the crank chamber and a feed pump for feeding oil to a part to be lubricated and to which the motive power from the crank shaft is transmittable.

Description of Related Art

Such a lubricating device of the internal combustion engine is disclosed in Japanese Patent Application Laid-Open Publication No. 2009-243437.

In the lubricating device disclosed in Japanese Patent Application Laid-Open Publication No. 2009-243437, a pump gear that is provided in the pump shaft shared by the scavenging pump and the feed pump is configured to mesh with a primary drive gear of a primary gear reduction mechanism which is located on the crank shaft. The primary drive gear is smaller in diameter than a primary driven gear, so that the scavenging pump and the feed pump must be arranged in a limited space around the primary drive gear of a smaller diameter. Therefore, it is difficult to shift positions of these pumps, and a degree of freedom in arrangement within the engine main body is decreased.

SUMMARY OF THE INVENTION

The present invention has been made in view of the foregoing circumstances, and it is an object of the present invention to provide a lubricating device of an internal combustion engine capable of increasing a degree of freedom in arrangement of a scavenging pump and a feed pump.

In order to achieve the above object, according to a first feature of the present invention, there is provided a lubricating device of an internal combustion engine having a crankcase constituting a part of an engine main body that is mounted on a vehicle and rotatably supporting a crank shaft, a crank chamber being provided in the crankcase, a transmission chamber being provided in the crankcase and arranged in the rear of the crank chamber so as to accommodate therein a gear transmission provided with a main shaft to which motive power from a crank shaft is inputted, and a pump shaft that is shared by a scavenging pump for pumping oil out of the crank chamber and a feed pump for feeding the oil to a part to be lubricated and to which the motive power from the crank shaft is transmittable. An axis of the pump shaft is arranged below an axis of the main shaft, and a pump gear located on the pump shaft meshes directly with a primary driven gear, which meshes with a primary drive gear located on the crank shaft so as to form a primary gear reduction mechanism in cooperation with the primary drive gear and which is arranged coaxially with the main shaft in such a condition as to be formed larger in diameter than the primary drive gear.

Therefore, the scavenging pump and the feed pump can be arranged in a relatively large space around the primary driven gear of a large diameter, so that a degree of freedom in arrangement of the scavenging pump and the feed pump can be increased. In addition, in order to transmit the motive power to the pump shaft, a transmission mechanism using a chain or the like in parallel with the primary gear reduction mechanism can be dispensed with. Therefore, an increase in size of the engine main body in the direction along the axis of the main shaft can be avoided. Further, by meshing with the primary driven gear which is larger in diameter, the pump gear can be formed smaller in diameter, whereby a space for arranging the pump gear can be reduced.

According to a second feature of the present invention, a discharge port, which is arranged in front of a lower end of a rotation locus of the crank shaft in a rotational direction of the crank shaft and located at the same level in a height direction with the lower end of the rotation locus, is provided in the crankcase so as to discharge the oil from the crank chamber, and the scavenging pump having at least a portion located in front of a rear end of the crank chamber is arranged in the rear of the discharge port in the crankcase. Therefore, the oil can be effectively discharged from the discharge port by the rotation of the crank shaft. At the same time, a distance from the discharge port to the scavenging pump can be shortened so as to perform the oil discharge from the crank chamber in good condition. In addition, the scavenging pump is prevented from being increased in size, and friction of the crank shaft can be reduced.

According to a third feature of the present invention, a recessed wall portion having a lower outer circumferential surface, which serves as a portion of an upper wall of an oil sump formed in a lower part of an interior of the crankcase, is provided in the crankcase so as to form a recess for accommodating the scavenging pump therein, and a lower end of the recessed wall portion is arranged in a higher position than an oil inflow port to the oil sump.

According to the third feature of the present invention, since the scavenging pump is accommodated in the recess of the recessed wall portion which serves as a portion of the upper wall of the oil sump, and the lower end of the recessed wall portion is arranged in the higher position than the oil inflow port to the oil sump, the height of the oil sump is ensured whereby defoaming action of the oil within the oil sump can be facilitated.

According to a fourth feature of the present invention, an oil discharge passage, which leads the oil discharged from the scavenging pump, is located in the crankcase and has at its upper end an outflow port, which opens into the transmission chamber above the main shaft.

According to the fourth feature of the present invention, since the outflow port on the upper end of the oil discharge passage which leads the oil discharged from the scavenging pump opens above the main shaft within the transmission chamber, the drive gear located on the main shaft can be effectively lubricated by the oil flowing out of the outflow port. Moreover, since the pump gear of the pump shaft meshes directly with the primary driven gear arranged coaxially with the main shaft, a distance between the pump shaft and the main shaft is a minimum necessary distance and the oil discharge passage also is a minimum necessary length, so that the crankcase can be prevented from being increased in size.

According to a fifth feature of the present invention, the oil discharge passage includes at least a vertically extending linear oil passage that extends linearly in an upward and downward direction so as to cross a drive gear constituting a portion of the gear transmission and arranged coaxially with the main shaft in a projection drawing on a plane orthogonal to an axis of the crank shaft and which has an upper end connected to the outflow port. Therefore, flow resistance attributable to an oil passage configuration of the oil discharge passage can be reduced, and the outflow port is arranged in a position close to the main shaft whereby the drive gear located on the main shaft can be lubricated more effectively According to a sixth feature of the present invention, a relief valve for ejecting the oil to the drive gear from below in a spraying manner when a pressure within the oil discharge passage is beyond a predetermined pressure is provided in an intermediate portion of the oil discharge passage. Since the oil ejected in a spraying manner from the relief valve connected to the intermediate portion of the oil discharge passage is sprayed from below on the drive gear located on the main shaft, the drive gear located on the main shaft can be lubricated more effectively.

Further, according to a seventh feature of the present invention, the outflow port includes a through hole that is formed in a wall portion facing the transmission chamber of the crankcase and is in communication with an upper end of the oil discharge passage. A guide wall for guiding the oil from the outflow port to a gear meshing portion of the gear transmission is formed integral with the crankcase, and an opposed guide plate, which is arranged along a portion of the guide wall so as to be opposed to an outer end of the outflow port, is fastened at one place to the crankcase. The oil flowing out of the outflow port formed as a through hole in the wall portion facing the transmission chamber of the crankcase flows toward the guide wall while running into the opposed guide plate, and then, the guide wall guides the oil from the outflow port to the gear meshing portion of the gear transmission. Therefore, the oil from the outflow port can be guided effectively to the gear meshing portion of the gear transmission. Moreover, since the opposed guide plate, which is arranged along a portion of the guide wall is fastened at one place to the crankcase, the opposed guide plate can be reduced in size, whereby the crankcase can be reduced in size and weight.

BRIEF DESCRIPTION OF THE DRAWINGS

These and further features of the invention will be apparent with reference to the following description and drawings, wherein.

DETAILED DESCRIPTION OF THE INVENTION

Hereinafter, an embodiment of the present invention will be described with reference to accompanying drawings. In the description, an orientation such as "front", "rear", "left", "right", "top" and "bottom" shall be the orientation as seen from a rider riding on a two-wheeled motorcycle on which the internal combustion engine is mounted.

Figure 1:
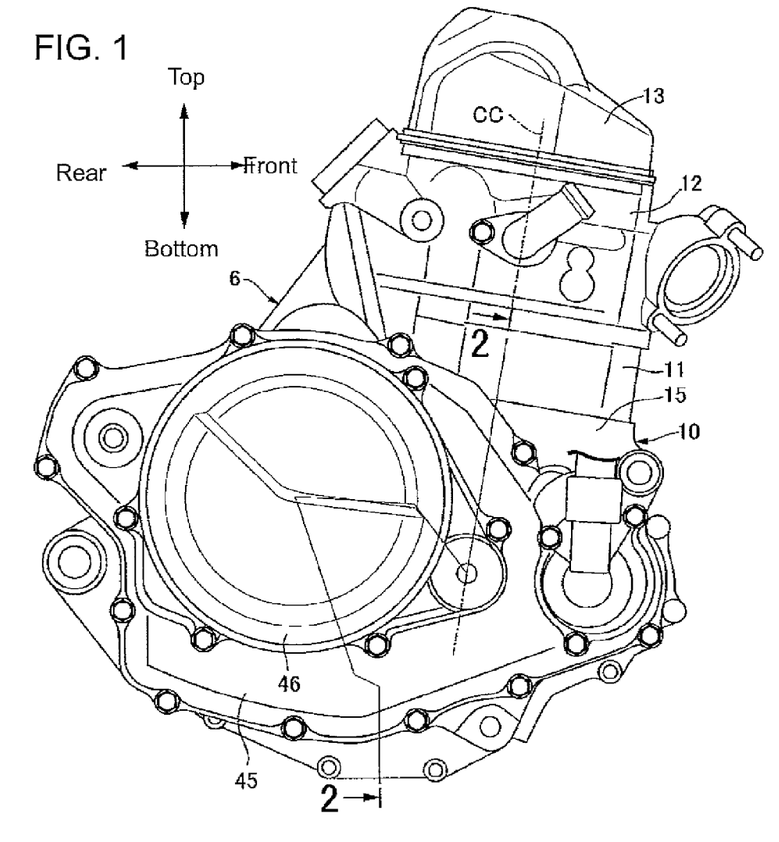
FIG. 1 is a right side view of an internal combustion engine.
Figure 2:
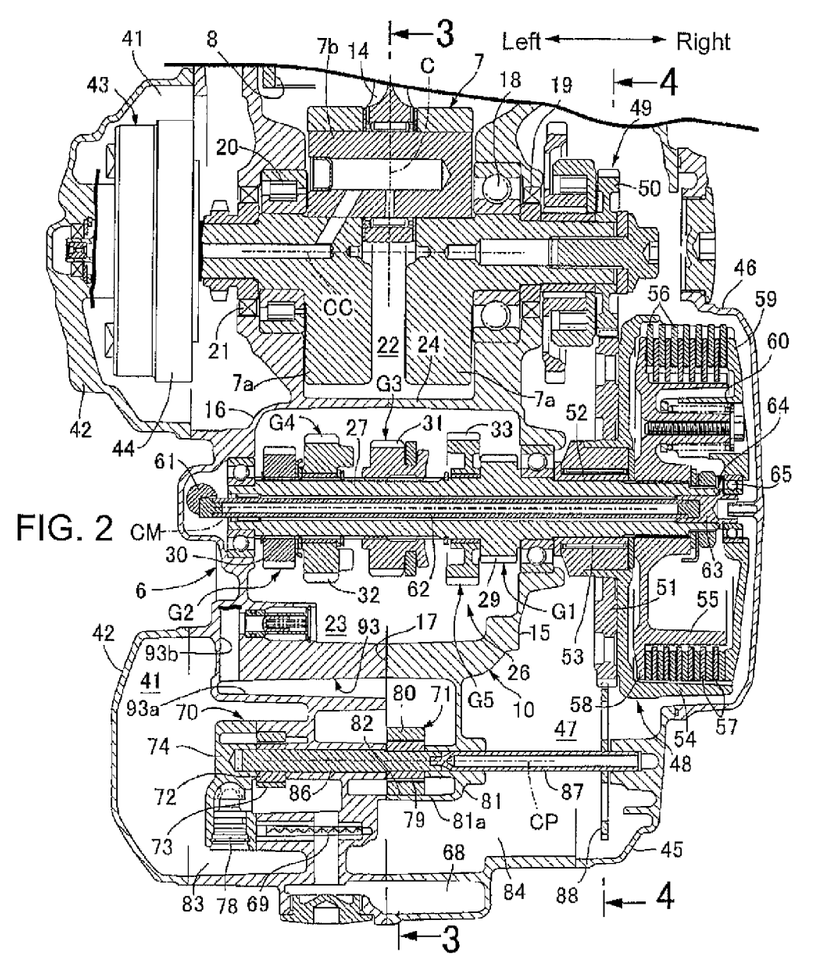
FIG. 2 is a cross sectional view taken on line 2-2 of FIG. 1.

Referring now to FIGS. 1 and 2, the internal combustion engine is to be mounted on the motorcycle, for example, and includes a crank shaft 7 having an axis arranged in the vehicle width direction of the motorcycle, a crankcase 10 rotatably supporting the crank shaft 7 thereon, an upwardly extending cylinder block 11 having a slightly forwardly inclined cylinder axis C and being connected to a front upper part of the crankcase 10, a cylinder head 12 being connected to an upper part of the cylinder block 11, and a head cover 13 being connected to an upper part of the cylinder head 12. This engine is formed with a single cylinder.

The crank shaft 7 is provided with left and right crank webs 7a and a crank pin 7b extending between these crank webs 7a. A piston (not shown) is slidably fitted in a cylinder bore 8 formed in the cylinder block 11. A large end of a connecting rod 14, which is connected through a piston pin to the piston, is rotatably connected to the piston pin 7b.

The crankcase 10 includes a right crankcase half body 15 arranged on the right side in the vehicle width direction and a left crankcase half body 16 arranged on the left side in the vehicle width direction that are joined to each other at a mating surface 17 extending along a plane orthogonal to an axis CC of the crank shaft 7. The crank shaft 7 passes through the right crankcase half body 15 in a rotatable manner by having a ball bearing 18 and a first annular seal member 19 interposed between the crank shaft 7 and the right crankcase half body 15, and it also passes through the left crankcase half body 16 in a rotatable manner by having a ball bearing 20 and a second annular seal member 21 interposed between the crank shaft 7 and the left crankcase half body 16.

Figure 3:
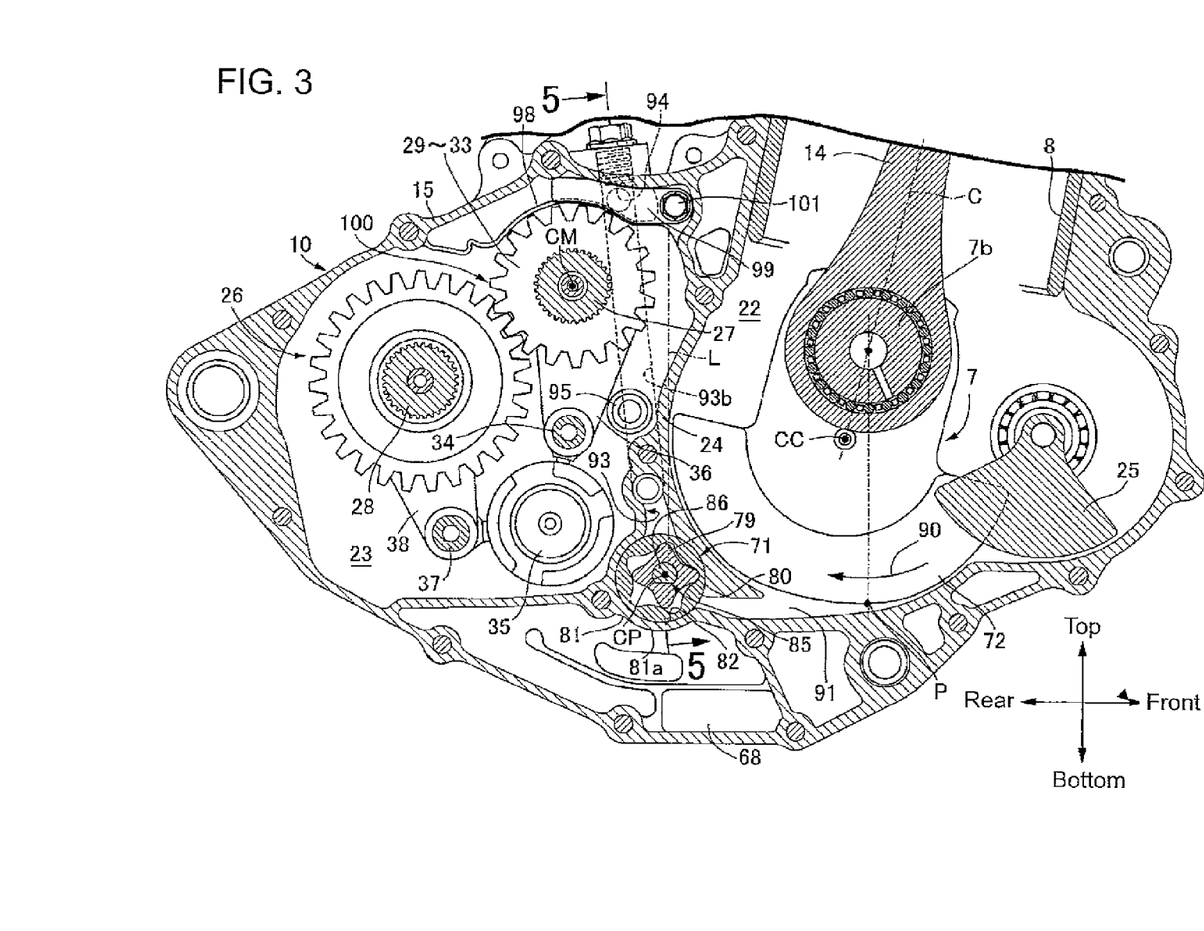
FIG. 3 is a cross sectional view taken on line 3-3 of FIG. 2.

Referring to FIG. 3 together, between the left and right crankcase half bodies 16, 15 of the crankcase 10, there are formed a crank chamber 22 communicating with an interior of the cylinder bore 8 and a transmission chamber 23 partitioned from the crank chamber 22 by a partition wall 24 that is interposed between the crank chamber 22 and the transmission chamber 23.

The partition wall 24 is formed in cooperation with the right crankcase half body 15 and the left crankcase half body 16. In the crank chamber 22, the crank webs 7a and the crank pin 7b of the crank shaft 7 are accommodated. Similarly, a balancer 25, which is connected to the crank shaft 7 in an interlocking manner, is accommodated in the crank chamber 22. The balancer 25 is arranged between the left and right crank webs 7a. In addition, the transmission chamber 23 is formed within the crankcase 10 in such a way as to be arranged in the rear of the crank chamber 22 in the forward and rearward direction of the vehicle.

A gear transmission 26 is accommodated in the transmission chamber 23. The gear transmission 26 includes a cylindrical main shaft 27, which is supported on the crankcase 10 so as to be rotatable around an axis parallel to the crank shaft 7, a counter shaft 28, which is supported on the crankcase 10 so as to be rotatable around an axis parallel to the main shaft 27, and a plurality of gear trains such as first to fifth speed gear trains G1, G2, G3, G4, G5, which are provided between the main shaft 27 and the counter shaft 28 so as to be able to be selectively established.

Drive gears 29, 30, 31, 32, 33, each of which constitutes a part of the first to fifth speed gear trains G1, G2, G3, G4, G5 individually, are arranged coaxially with the main shaft 27, and the rotational motive power of the counter shaft 28 is transmitted to a rear wheel (not shown).

Further, a first shift fork shaft 34 is located below the main shaft 27. A shift drum 35 is located below the first shift fork shaft 34. A first shift fork 36, which moves in the axial direction in accordance with the rotation of the shift drum 35, is supported on the shift fork shaft 34. A second shift fork 38, which moves in the axial direction in accordance with the rotation of the shift drum 35, is supported on a second shift fork shaft 37, which is located below the counter shaft 28.

Referring to FIG. 2, to the left crankcase half body 16 there is fastened a generator cover 42, which forms a generator room 41 between itself and the left crankcase half body 16 in such a manner that the oil is able to flow between the generator room 41 and the transmission chamber 23. A left end portion of the crank shaft 7 projecting from the left crankcase half body 16 is fixedly secured to a rotor 44 of a generator 43 accommodated in the generator room 41.

Further, to the right crankcase half body 15 there is fastened a circumferential edge portion of a right side cover 45, which projects rightward from the right crankcase half body 15. A clutch cover 46 is fastened to the right side cover 45, and a clutch chamber 47 is formed by the right crankcase half body 15, the right cover and the clutch cover 46.

Figure 4:
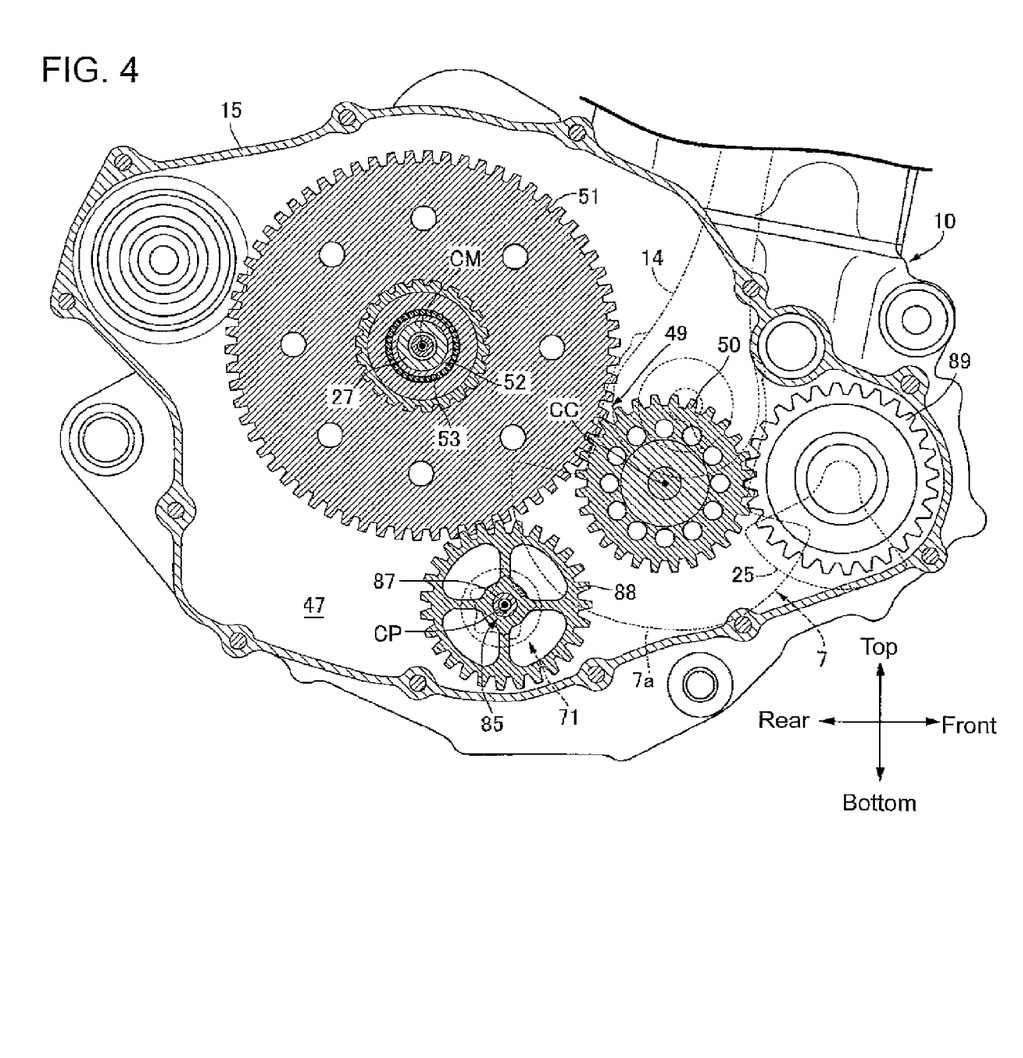
FIG. 4 is a cross sectional view taken on line 4-4 of FIG. 2.

Referring to FIG. 4 together, a right end portion of the crank shaft 7, which projects from the right crankcase half body 15, extends into the clutch chamber 47, and also a right end portion of the main shaft 27 of the gear transmission 26 extends into the clutch chamber 47. In the clutch chamber 47 there are accommodated a clutch mechanism 48 that connects and disconnects motive power transmission between the crank shaft 7 and the main shaft 7 and a primary gear reduction mechanism 49, which transmits the motive power of the crank shaft 7 to the clutch mechanism 48.

The primary gear reduction mechanism 49 is composed of a primary drive gear 50, which is fixedly secured to the right end portion of the crank shaft 7 projecting from the right crankcase half body 15, and a primary driven gear 51, which is located coaxially with the main shaft so as to mesh with the primary drive gear 50. The primary driven gear 51 is formed larger in diameter than the primary drive gear 50. A cylindrical sleeve 52, which extends in the axial direction of the main shaft 27, is fitted on an outer circumference of the main shaft 27 located in a region corresponding to the primary gear reduction mechanism 49.

The clutch mechanism 48 is formed in a multiple disc type and includes a clutch outer part 54, which is supported through a needle bearing 53 on the sleeve 52 in a relatively rotatable manner and connected to the primary driven gear 51, a clutch inner part 55, which is connected to the main shaft 27 in an interlocking manner, a plurality of drive friction plates 56, which are engaged with the clutch outer part 54 in a relatively non-rotatable manner, a plurality of driven friction plates 57, which are arranged between the drive friction plates 56 in an overlapping state with each other and engaged with the clutch inner part 55 in a relatively non-rotatable manner, a pressure plate 58, which is formed integral with the clutch inner part 55 so as to be arranged face to face with the drive friction plate 56 corresponding to a friction plate, which is located on an end in the axial direction of the clutch inner part 55 among the plurality of drive friction plates 56 and the plurality of driven friction plates 57, a pressing plate 59, which presses the plurality of drive friction plates 56 and the plurality of the driven friction plates 57 against the pressure plate 58, and a plurality of clutch springs 60, which develop spring biasing force to bias the pressing plate 59 to the side on which the drive friction plates 56 and the driven friction plates 57 are brought into pressing contact between the pressing plate 59 and the pressure plate 58.

The connection and disconnection of the motive power transmission by the clutch mechanism 16 are shifted by a clutch release mechanism 64. The clutch release mechanism 64 includes a release rod 61 being rotatably supported on the left crankcase half body 16, a transmission shaft 62 being inserted into the main shaft 27 so as to move in the axial direction of the main shaft 27 in accordance with the rotation of the release rod 61, and a lifter piece 63 being connected to an end portion of the transmission shaft 62 on the clutch mechanism 48 side so as to be supported on the main shaft 27 in an axially movable manner.

A center portion of the pressing plate 59 is supported on the lifter piece 63 through a clutch bearing 65. When the pressing plate 59 is pushed by the lifter piece 63, it is displaced against spring force of the clutch spring 60 toward the side to be separated apart from the pressure plate 58, so that the clutch mechanism 48 is brought into a state of disconnection. When operation force applied to the lifter piece 63 is released, the pressing plate 59 is displaced by the spring force of the clutch spring 60 toward the side to approach the pressure plate 58, so that the clutch mechanism 48 is brought into a state of connection (motive power transmission).

An oil sump 68 is formed in a lower part of an interior of the crankcase 10. The oil of the oil sump 68 is pumped up by a feed pump 70 through a primary filter 69, which is arranged in a lower part of the left crankcase half body 16. The oil discharged from the feed pump 70 is fed to regions to be lubricated, such as a region related to the crank shaft 7, an interior of the transmission chamber 23, an interior of the clutch chamber 47, the cylinder head side or the like. Moreover, the oil of the crank chamber 22 is pumped out by a scavenging pump 71. The feed pump 70 and the scavenging pump 71 are arranged coaxially.

Figure 5:
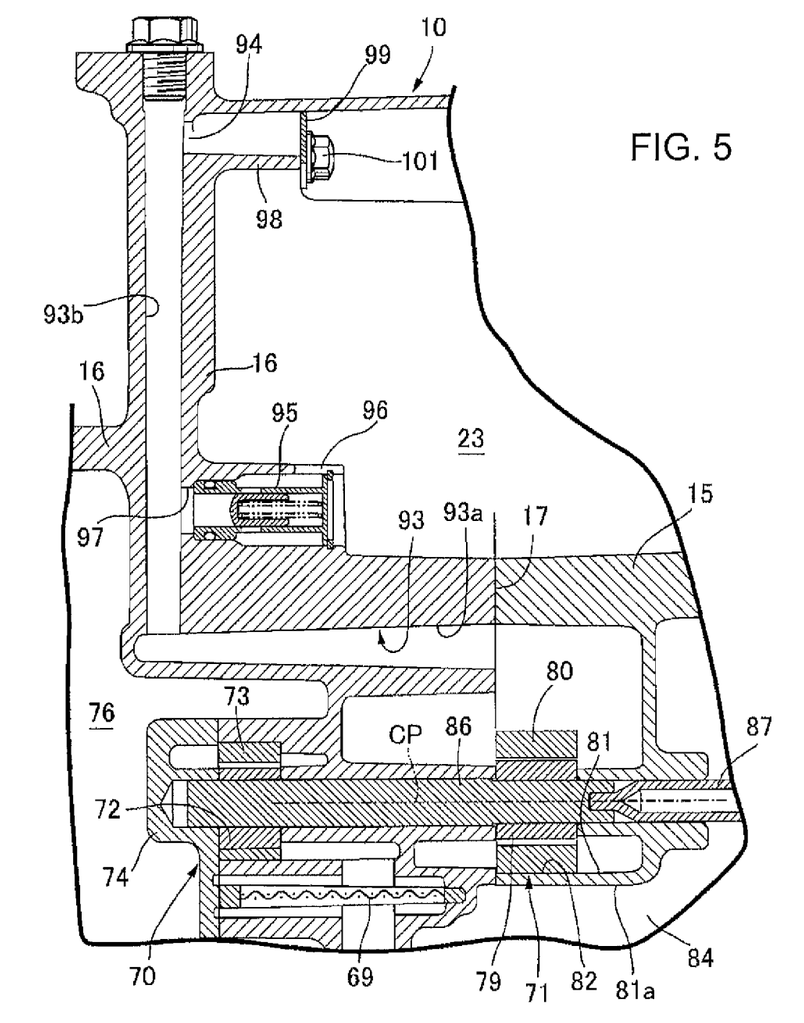
FIG. 5 is a cross sectional view taken on line 5-5 of FIG. 3.

Referring to FIG. 5 together, the feed pump 70 is a trochoid pump which has a first inner rotor 72 and a first outer rotor 73 meshing with the first inner rotor 72. The first inner rotor 72 and the first outer rotor 73 are accommodated between the lower part of the left crankcase half body 16 and a pump cover 74, which is joined to the lower part of the left crankcase half body 16.

A first relief valve 78, which is opened when a discharge pressure of the feed pump 70 exceeds a predetermined pressure so as to return surplus oil to the oil sump 68 side, is arranged in the pump cover 74.

The scavenging pump 71 also is a trochoid pump similar to the feed pump 70 and has a second inner rotor 79 and a second outer rotor 80, which meshes with the second inner rotor 79. The second inner rotor 79 and the second outer rotor 80 are accommodated in a recessed portion 82 formed in a recessed wall part 81, which is provided integral with the right crankcase half body 15.

A lower outer circumferential surface of the recessed wall part 81 serves as a portion of an upper wall of the oil sump 68, and a lower end 81a of the recessed wall part 81 is located in a higher position than inflow ports 83, 84 of the oil from each of the generator room 41 and the clutch chamber 47 to the oil sump 68.

Each of the inner rotors 72, 79 of the feed pump 70 and the scavenging pump 71 is rotated and driven by a common pump shaft 85. This pump shaft 85 includes a first shaft member 86, which is rotatably supported at its both ends on the pump cover 74 and the right crankcase half body 15, and a second shaft member 87 one end portion of which is connected to the first shaft member 86 in a relatively non-rotatable manner and the other end portion of which is rotatably supported on the right side cover 45. The inner rotors 72, 79 are fixedly secured to the first shaft member 86. Further, an axis CP of the pump shaft 85 is located below the axis CM of the main shaft 27.

The reason why the pump shaft 85 is divided into the first shaft member 86 on an inner side of the crankcase 10 and the second shaft member 87 on an outer side of the crank shaft 10 is to improve the assemblability. A pump gear 88, which is fixedly mounted on the second shaft member 87 of the pump shaft 85, is configured to mesh directly with the primary driven gear 51 of the primary gear reduction mechanism 49.

Further, a balancer gear 89 linked to the balancer 25 is arranged in the clutch chamber 47. The balancer gear 89 is configured to mesh directly with the primary drive gear 50 of the primary gear reduction mechanism 49.

Further, as shown in FIG. 3, a discharge port 91, which is arranged in front of a lower end P of a rotation locus of the crank shaft 7, namely, a lower end P of a rotation locus of the outer circumference of the crank web 7a in a rotational direction 90 of the crank shaft 7 and located at the same level in a height direction with the lower end P of the rotation locus, is provided in the right crankcase half body 15 of the crankcase 10 so as to discharge the oil from the crank chamber 22. The scavenging pump 71 has at least a portion that is arranged in front of a rear end of the crank chamber 22 in the forward and rearward direction of the vehicle, namely, in front of a vertical line L passing through the rear end of the crank chamber 22 in the forward and rearward direction of the vehicle. This scavenging pump 71 is arranged in the rear of the discharge port 91 in the forward and rearward direction of the vehicle in the right crankcase half body 15.

The oil discharged out of the scavenging pump 71 is led by an oil discharge passage 93 provided in the crankcase 10. The oil discharge passage 93 is provided at an upper end thereof with an outflow port 94, which is located above the main shaft 27 so as to open into the transmission chamber 23.

The oil discharge passage 93 is configured to have at least a vertically extending linear oil passage portion 93b, which extends linearly in the upward and downward direction so as to cross the drive gears 29~33 constituting a portion of the gear transmission 26 and arranged coaxially with the main shaft 27 in a projection drawing on a plane orthogonal to the axis CC of the crank shaft 7 and which has an upper end connected to the outflow port 94. In this embodiment, the oil discharge passage 93 includes a horizontally extending linear oil passage portion 93a, which has one end connected to the scavenging pump 71 and which is formed in both the right crankcase half body 15 and the left crankcase half body 16 so as to extend in parallel with the pump shaft 85, and the vertically extending linear oil passage portion 93b, which has a lower end portion connected to the other end of the horizontally extending linear oil passage portion 93a, which is formed in the left crankcase half body 16 in such a way as to extend linearly in the obliquely upward direction.

A second relief valve 95, which has an upwardly directed relief opening 96 so as to eject the oil to the drive gears 29~33 from below in a spraying manner when a pressure within the oil discharge passage 93 is beyond a predetermined level, is connected to an intermediate portion of the oil discharge passage 93. In this embodiment, the second relief valve 95 is connected through a connecting oil passage 97 to the intermediate portion of the vertically extending linear oil passage portion 93b.

Further, the outflow port 94 is a through hole, which is formed in a wall portion facing the transmission chamber 23 of the left crankcase half body 16 of the crankcase 10 and is in communication with the upper end of the vertically extending linear oil passage portion of the oil discharge passage 93. A guide wall 98 for guiding the oil from the outflow port 94 is formed integral with the left crankcase half body 16. An opposed guide plate 99, which is arranged along a portion of the guide wall 98 so as to be opposed to an outer end of the outflow port 94, is fastened at one place to the left crankcase half body 16 by a bolt 101.

Further, the guide wall 98 is formed in a shape to guide the oil from the outflow port 94 so as to drip the oil toward a gear meshing portion 100 of the gear transmission 26 from directly above the gear meshing portion 100.

Next, the operation of this embodiment will be described. The axis CP of the pump shaft 85, which is shared by the scavenging pump 71 and the feed pump 70, is located below the axis CM of the main shaft 27 of the gear transmission 26, and the pump gear 88 provided on the pump shaft 85 meshes directly with the primary driven gear 51, which meshes with the primary drive gear 50 so as to constitute the primary gear reduction mechanism 49 in cooperation with the primary drive gear 50 provided on the crank shaft 7 and which is arranged coaxially with the main shaft 27 in such a condition as to be formed larger in diameter than the primary drive gear 50. With this construction, the scavenging pump 71 and the feed pump 70 can be arranged in a relatively large space around the primary driven gear 51 of a large diameter, so that a degree of freedom in arrangement of the scavenging pump 71 and the feed pump 70 can be increased. In addition, in order to transmit the motive power to the pump shaft 85, a transmission mechanism using a chain or the like in parallel with the primary gear reduction mechanism 49 can be dispensed with. Therefore, an increase in size of the engine main body 6 in the direction along the axis CM of the main shaft 27 can be avoided. Further, since the pump gear 88 meshes with the primary driven gear 51, which is larger in diameter, it can be formed smaller in diameter, whereby a space for arranging the pump gear 88 can be reduced.

Further, the discharge port 91, which is arranged in front of the lower end P of the rotation locus of the crank shaft 7 in the rotational direction 90 of the crank shaft 7 and which is located at the same level in a height direction with the lower end P of the rotation locus is provided in the crankcase 10 so as to discharge the oil from the crank chamber 22, and the scavenging pump 71 having at least a portion located in front of the rear end of the crank chamber 22 in the forward and rearward direction of the vehicle is arranged in the rear of the discharge port 91 in the crankcase 10 in the forward and rearward direction of the vehicle. Therefore, the oil can be effectively discharged from the discharge port 91 by the rotation of the crank shaft 7. At the same time, the distance from the discharge port 91 to the scavenging pump 71 can be shortened so as to perform the oil discharge from the crank chamber 22 in suitable condition. In addition, the scavenging pump 71 is prevented from being increased in size, and the friction of the crank shaft 7 can be reduced.

Further, the recessed wall portion 81 having the lower outer circumferential surface, which serves as a portion of the upper wall of the oil sump 68 formed in the lower part of the crankcase 10, is arranged in the crankcase 10 so as to be formed with the recess 82 for accommodating the scavenging pump 71, and the lower end 81a of the recessed wall portion 81 is arranged in the higher position than the oil inflow ports 83, 84 to the oil sump 68. With this construction, the height of the oil sump 68 is ensured whereby the defoaming action of the oil within the oil sump 68 can be facilitated.

Further, since the oil discharge passage 93 for leading the oil discharged from the scavenging pump 71 has at its upper end the outflow port 94 opening into the transmission chamber 23 at the higher position than the main shaft 27 and is provided in the crankcase 10, the drive gears 29~33 located on the main shaft 27 can be effectively lubricated by the oil flowing out of the outflow port 94. Moreover, since the pump gear 88 of the pump shaft 85 meshes directly with the primary driven gear 51 arranged coaxially with the main shaft 27, the distance between the pump shaft 85 and the main shaft 27 is a minimum necessary distance and the oil discharge passage 93 also is a minimum necessary length, so that the crankcase 10 can be prevented from being increased in size.

Further, since the oil discharge passage 93 has at least the vertically extending linear oil passage 93*b*, which extends linearly in the upward and downward direction so as to cross the drive gears 29~33 constituting a portion of the gear transmission 26 and arranged coaxial with the main shaft 27 in the projection drawing on a plane orthogonal to the axis of the crank shaft 7 and which has the upper end connected to the outflow port 94, the flow resistance attributable to an oil passage configuration of the oil discharge passage 93 is reduced and the outflow port 94 is arranged in a position close to the main shaft 27, so that the drive gears 29~33 located on the main shaft 27 can be lubricated more effectively.

Further, since the second relief valve 95, which ejects the oil to the drive gears 29~33 from below in a spraying manner is connected to the intermediate portion of the oil discharge passage 93, the oil splash ejected from the second relief valve 95 is sprayed from below on the drive gears 29~33 located on the main shaft 27, so that the drive gears 29~33 located on the main shaft 27 can be lubricated more effectively.

Further, the outflow port 94 is the through hole, which is formed in the wall portion facing the transmission chamber 23 of the crankcase 10 and which is in communication with the upper end of the oil discharge passage 93. The guide wall 98, which guides the oil from the outflow port 94 to the gear meshing portion 100 of the gear transmission 26, is integrally formed with the crankcase 10, and the opposed guide plate 99, which is arranged face to face with the outer end of the outflow port 94 and along a portion of the guide wall 99, is fastened at one place to the crankcase 10. With this construction, the oil from the outflow port 94 can be guided effectively to the gear meshing portion 100 of the gear transmission 26, and the opposed guide plate 99 can be reduced in size, whereby the crankcase 10 can be reduced in size and weight.

While a preferred embodiment has been described, it is to be understood that various design changes and modifications may be made in the invention without departing from the spirit and scope thereof.

DESCRIPTION OF REFERENCE CHARACTERS

6: Engine main body, 7: Crank shaft, 10: Crankcase, 22: Crank chamber, 23: Transmission chamber, 26: Gear transmission, 27: Main shaft, 29, 30, 31, 32, 33: Drive gear, 49: Primary gear reduction mechanism, 50: Primary drive gear, 51: Primary driven gear, 68: Oil sump, 70: Feed pump, 71: Scavenging pump, 81: Recessed wall portion, 81*a*: Lower end of recessed wall portion, 82: Recess, 83, 84: Inflow port, 85: Pump shaft, 88: Pump gear, 90: Rotational direction of crank shaft, 91: Discharge port, 93: Oil discharge passage, 93*b*: Vertically extending linear oil passage portion, 94: Outflow port, 95: Relief valve, 98: Guide wall, 99: Opposed guide plate, 100: Gear meshing portion, CC: Axis of crank shaft, CM: Axis of main shaft, CP: Axis of pump shaft, P: Lower end of rotation locus of crank shaft

What is claimed is:

1. A lubricating device of an internal combustion engine comprising: a crankcase constituting a part of an engine main body that is mounted on a vehicle and rotatably supporting a crank shaft; a crank chamber being formed in the crankcase; a transmission chamber being formed in the crankcase and arranged in the rear of the crank chamber in a vehicle front-to-rear direction so as to accommodate therein a gear transmission provided with a main shaft to which motive power from the crank shaft is inputted; and a pump shaft that is shared by a scavenging pump for pumping oil out of the crank chamber and a feed pump for feeding the oil to a part to be lubricated and to which the motive power from the crank shaft is transmitted; wherein an axis of the pump shaft is arranged below an axis of the main shaft in a vehicle height direction, and a pump gear located on the pump shaft meshes directly with a primary driven gear, the primary driven gear meshes with a primary drive gear located on the crank shaft so as to form a primary gear reduction mechanism in cooperation with the primary drive gear and the primary driven gear is arranged coaxially with the main shaft, the primary driven gear having a diameter greater than a diameter of the primary drive gear; and a discharge port arranged rearward in the vehicle front-to-rear direction of a lower end in the vehicle height direction of a rotation locus of an outer circumference of a crank web and located at the same level in the vehicle height direction with the lower end of the rotation locus, wherein the discharge port is provided in the crankcase so as to discharge the oil from the crank chamber, the scavenging pump has at least a portion located in front in the vehicle front-to-rear direction of the rear of the crank chamber, and the scavenging pump is arranged in a rear in the vehicle front-to-rear direction of the discharge port in the crankcase.

2. The lubricating device of an internal combustion engine according to claim 1, further comprising a recessed wall portion having a lower outer circumferential surface in the vehicle height direction that serves as a portion of an upper wall in the vehicle height direction of an oil sump formed in a lower part in the vehicle height direction of an interior of the crankcase, wherein the recessed wall portion is provided in the crankcase and forms a recess for accommodating the scavenging pump therein, and a lower end in the vehicle height direction of the recessed wall portion is arranged in a higher position than an oil inflow port to the oil sump.

3. The lubricating device of an internal combustion engine according to claim 1, further comprising an oil discharge passage for leading the oil discharged from the scavenging pump, wherein the oil discharge passage is located in the crankcase, and provided at an upper end in the vehicle height direction of the oil discharge passage is an outflow port that opens into the transmission chamber above the main shaft.

4. The lubricating device of an internal combustion engine according to claim 3, wherein the oil discharge passage comprises at least a vertically extending linear oil passage that extends linearly in the vehicle height direction and has an upper end connected to the outflow port, the vertically extending linear oil passage arranged to cross a drive gear constituting a portion of the gear transmission and arranged coaxially with the main shaft.

5. The lubricating device of an internal combustion engine according to claim 4, further comprising a relief valve for ejecting oil to the drive gear from below in the vehicle height direction in a spraying manner when a pressure within the oil discharge passage is beyond a predetermined pressure, wherein the relief valve is provided in an intermediate portion of the oil discharge passage.

6. The lubricating device of an internal combustion engine according to claim 3, wherein the outflow port comprises a through hole that is formed in a wall portion facing the transmission chamber of the crankcase, the through hole in communication with the upper end of the oil discharge passage, and wherein a guide wall for guiding the oil from the outflow port to a gear meshing portion of the gear transmission is formed integral with the crankcase, and an opposed guide plate, which is arranged along a portion of the guide wall so as to be opposed to an outer end of the outflow port, is fastened to the crankcase.

7. The lubricating device of an internal combustion engine according to claim 2, further comprising an oil discharge passage for leading the oil discharged from the scavenging pump, wherein the oil discharge passage is located in the crankcase, and provided at an upper end in the vehicle height direction of the oil discharge passage is an outflow port that opens into the transmission chamber above the main shaft.

8. The lubricating device of an internal combustion engine according to claim 7, wherein the oil discharge passage comprises at least a vertically extending linear oil passage that extends linearly in the vehicle height direction and has an upper end connected to the outflow port, the vertically extending linear oil passage arranged to cross a drive gear constituting a portion of the gear transmission and arranged coaxially with the main shaft.

9. The lubricating device of an internal combustion engine according to claim 8, further comprising a relief valve for ejecting oil to the drive gear from below in the vehicle height direction in a spraying manner when a pressure within the oil discharge passage is beyond a predetermined pressure, wherein the relief valve is provided in an intermediate portion of the oil discharge passage.

10. The lubricating device of an internal combustion engine according to claim 4, wherein the outflow port comprises a through hole that is formed in a wall portion facing the transmission chamber of the crankcase, the through hole in communication with the upper end of the oil discharge passage, and wherein a guide wall for guiding the oil from the outflow port to a gear meshing portion of the gear transmission is formed integral with the crankcase, and an opposed guide plate, which is arranged along a portion of the guide wall so as to be opposed to an outer end of the outflow port, is fastened to the crankcase.

11. The lubricating device of an internal combustion engine according to claim 5, wherein the outflow port comprises a through hole that is formed in a wall portion facing the transmission chamber of the crankcase, the through hole in communication with the upper end of the oil discharge passage, and wherein a guide wall for guiding the oil from the outflow port to a gear meshing portion of the gear transmission is formed integral with the crankcase, and an opposed guide plate, which is arranged along a portion of the guide wall so as to be opposed to an outer end of the outflow port, is fastened at one place to the crankcase.

* * * * *